US012572146B2

(12) United States Patent
Gayne et al.

(10) Patent No.: US 12,572,146 B2
(45) Date of Patent: Mar. 10, 2026

(54) APPARATUS, SYSTEM, AND METHOD OF DOCKING FOR AUTONOMOUS ROBOT NAVIGATION

(71) Applicant: JABIL INC., St. Petersburg, FL (US)

(72) Inventors: Jarrett Gayne, St. Petersburg, FL (US); Christopher Jones, St. Petersburg, FL (US)

(73) Assignee: JABIL INC.

( * ) Notice: Subject to any disclaimer, the term of this patent is extended or adjusted under 35 U.S.C. 154(b) by 956 days.

(21) Appl. No.: 17/251,682

(22) PCT Filed: Jun. 11, 2019

(86) PCT No.: PCT/US2019/036569
§ 371 (c)(1),
(2) Date: Dec. 11, 2020

(87) PCT Pub. No.: WO2019/241262
PCT Pub. Date: Dec. 19, 2019

(65) Prior Publication Data
US 2022/0197298 A1     Jun. 23, 2022

Related U.S. Application Data

(60) Provisional application No. 62/683,449, filed on Jun. 11, 2018.

(51) Int. Cl.
G05D 1/00          (2024.01)
G06T 7/50          (2017.01)
(52) U.S. Cl.
CPC ......... G05D 1/0225 (2013.01); G05D 1/0234 (2013.01); G05D 1/0238 (2013.01);
(Continued)

(58) Field of Classification Search
CPC .. G05D 1/0225; G05D 1/0234; G05D 1/0238; G05D 1/0246; G06T 7/50;
(Continued)

(56) References Cited

U.S. PATENT DOCUMENTS 9,538,892 B2    1/2017  Fong
9,632,504 B1    4/2017  Watts
(Continued)

FOREIGN PATENT DOCUMENTS

CN          103645733          3/2014
CN          105788161 A        7/2016
(Continued)

OTHER PUBLICATIONS

Chinese Office Action issued in App. No. CN20198046224, dated Jan. 27, 2024, 5 pages.
(Continued)

*Primary Examiner* — Anne Marie Antonucci
*Assistant Examiner* — Patrick M Brady
(74) *Attorney, Agent, or Firm* — Riverside Law LLP

(57) ABSTRACT

An apparatus, system and method of operating an autonomous mobile robot having a height of at least one meter, which may include a robot body; at least two three-dimensional depth camera sensors affixed to the robot body and directed toward a major floor surface from the affixation; and a processing system for receiving of data within the field of view from the at least one three-dimensional depth camera sensor, detecting the presence of a plurality of AR tags on the upper surface of the charging base, calculating a virtual alignment point associated with the center of the robot docking connector, calculating a virtual alignment point associated with the center of the charging base docking connector, and outputting a path of travel between the center of the charging base docking connector and the center of the
(Continued)

robot docking connector, whereby a physical connection is made.

19 Claims, 5 Drawing Sheets

(52) U.S. Cl.
CPC ............. *G05D 1/0246* (2013.01); *G06T 7/50* (2017.01); *G06T 2207/10028* (2013.01); *G06T 2207/30204* (2013.01); *G06T 2207/30261* (2013.01)

(58) Field of Classification Search
CPC . G06T 2207/10028; G06T 2207/30204; G06T 2207/30261
See application file for complete search history.

(56) References Cited

U.S. PATENT DOCUMENTS

| 10,365,646 | B1 | 7/2019 | Farnsworth | |
| 2005/0156562 | A1 | 7/2005 | Cohen | |
| 2005/0248758 | A1 | 11/2005 | Carron | |
| 2007/0257910 | A1* | 11/2007 | Gutmann | G06V 20/10 |
| | | | | 700/262 |
| 2010/0235088 | A1 | 9/2010 | Li | |
| 2011/0054689 | A1 | 3/2011 | Nielsen | |
| 2012/0035797 | A1 | 2/2012 | Oobayashi | |
| 2014/0103224 | A1 | 4/2014 | Ng | |
| 2014/0350725 | A1 | 11/2014 | Lafary | |
| 2015/0212521 | A1* | 7/2015 | Pack | G05D 1/0251 |
| | | | | 701/28 |
| 2015/0253777 | A1* | 9/2015 | Binney | G05D 1/0214 |
| | | | | 701/28 |
| 2016/0091899 | A1* | 3/2016 | Aldred | B25J 5/00 |
| | | | | 901/1 |
| 2016/0129593 | A1 | 5/2016 | Wolowelsky | |
| 2016/0375592 | A1 | 12/2016 | Szatmary | |
| 2016/0375862 | A1 | 12/2016 | Ito | |
| 2017/0028564 | A1 | 2/2017 | Lowy | |
| 2017/0113352 | A1 | 4/2017 | Lutz | |
| 2017/0285651 | A1 | 10/2017 | Ji | |
| 2017/0357270 | A1* | 12/2017 | Russell | B25J 9/162 |
| 2018/0005035 | A1 | 1/2018 | Bogolea | |
| 2018/0038697 | A1* | 2/2018 | Li | G01C 21/206 |
| 2018/0050698 | A1 | 2/2018 | Polisson | |
| 2018/0059682 | A1 | 3/2018 | Thode | |
| 2018/0137728 | A1 | 5/2018 | Hahn | |
| 2018/0275668 | A1* | 9/2018 | Diehr | B08B 3/02 |
| 2019/0011950 | A1* | 1/2019 | Shaw | H01F 7/0205 |
| 2019/0022870 | A1* | 1/2019 | Miyazaki | G10L 15/075 |
| 2019/0176637 | A1* | 6/2019 | Booth | H02J 7/0013 |
| 2019/0180150 | A1* | 6/2019 | Taylor | G06V 30/224 |
| 2019/0204844 | A1* | 7/2019 | Lau | G05D 1/0274 |
| 2019/0235511 | A1 | 8/2019 | Tiwari | |
| 2020/0316786 | A1* | 10/2020 | Galluzzo | B25J 9/162 |

FOREIGN PATENT DOCUMENTS

| CN | 105813526 | 7/2016 |
| CN | 106003047 | 10/2016 |
| CN | 107193283 | 9/2017 |
| CN | 206536514 | 10/2017 |
| CN | 107838927 | 3/2018 |
| KR | 20160104953 | 9/2016 |

OTHER PUBLICATIONS

Office Action (Non-Final Rejection) dated Jan. 24, 2024 for U.S. Appl. No. 17/044,018 (pp. 1-23).
Justinas Miseikis et al, "3D Vision Guided Robotic Charging Station for Electric and Plug-in Hybrid Vehicles", arxiv.org, Cornell University Library, 201 Olin Library Cornell University Ithaca, NY 14853, (Mar. 15, 2017), XP080757309.
Office Action (Final Rejection) dated Sep. 21, 2023 for U.S. Appl. No. 17/044,018 (pp. 1-18).
The State Intellectual Property Office of People's Republic of China, First Office Action dated Apr. 28, 2023 for CN App. No. 201980046224.
Tsai Dorian et al, "Autonomous vision-based tethered-assisted rover docking", 2013 IEEE/RSJ International Conference On Intelligent Robots and Systems(ROS), IEEE, doi:10.1109/IROS.2013. 6696757, ISSN 2153-0858, (Nov. 3, 2013), pp. 2834-2841, (Dec. 26, 2013), XP032537837.
CN105788161A (translation) (Year: 2016) 11 pages.
Office Action (Final Rejection) dated May 29, 2024 for U.S. Appl. No. 17/044,018 (pp. 1-21).
Office Action (Non-Final Rejection) dated Aug. 27, 2024 for U.S. Appl. No. 17/044,018 (pp. 1-25).

\* cited by examiner

APPARATUS, SYSTEM, AND METHOD OF DOCKING FOR AUTONOMOUS ROBOT NAVIGATION

CROSS-REFERENCE TO RELATED APPLICATION

This application is a national stage application of PCT/US2019/036569, filed Jun. 11, 2019, entitled APPARATUS, SYSTEM, AND METHOD OF DOCKING FOR AUTONOMOUS ROBOT NAVIGATION, which claims the benefit of priority to U.S. Provisional Application No. 62/683,449, filed Jun. 11, 2018, entitled APPARATUS, SYSTEM, AND METHOD OF DOCKING FOR AUTONOMOUS ROBOT NAVIGATION, the entirety of which is incorporated herein by reference as if set forth in its entirety.

BACKGROUND

Field of the Disclosure

The disclosure relates generally to robotics, and, more particularly, to an apparatus, system, and method of using depth assessment for autonomous robot navigation.

Background of the Disclosure

An autonomous robot needs to be charged on a daily basis. Without a docking station, the robot will need to be manually plugged and unplugged by an associate or a service technician.

SUMMARY OF THE DISCLOSURE

Many details are required for a robot to approach a docking station and align precisely to a connector for a successful charge connection. As disclosed, the robot contains depth cameras that are designed to avoid objects. The autonomous robot uses an AR tag/camera alignment system to mate with a charging dock.

The disclosure is and includes at least an apparatus, system and method of operating an autonomous mobile robot having a height of at least one meter. The apparatus, system and method may include a robot body; at least two three-dimensional depth camera sensors affixed to the robot body proximate to the height, wherein the at least two three-dimensional depth camera sensors are both directed toward a major floor surface from the affixation and, in combination, comprise an at least substantially 360 degree field of view around the robot body; and a processing system communicative with the at least two three dimensional depth camera sensors and comprising non-transitory computing code. The processing system may execute the steps of: receiving of data within the field of view from the at least one three-dimensional depth camera sensor, detecting the presence of a plurality of AR tags on the upper surface of the charging base, calculating a virtual alignment point associated with the center of the robot docking connector, calculating a virtual alignment point associated with the center of the charging base docking connector, and outputting a path of travel between the center of the charging base docking connector and the center of the robot docking connector, whereby a physical connection is made.

BRIEF DESCRIPTION OF THE DRAWINGS

The disclosure is illustrated by way of example and not limitation in the accompanying drawings, in which like references indicate similar elements, and in which.

DETAILED DESCRIPTION

Figure 1:
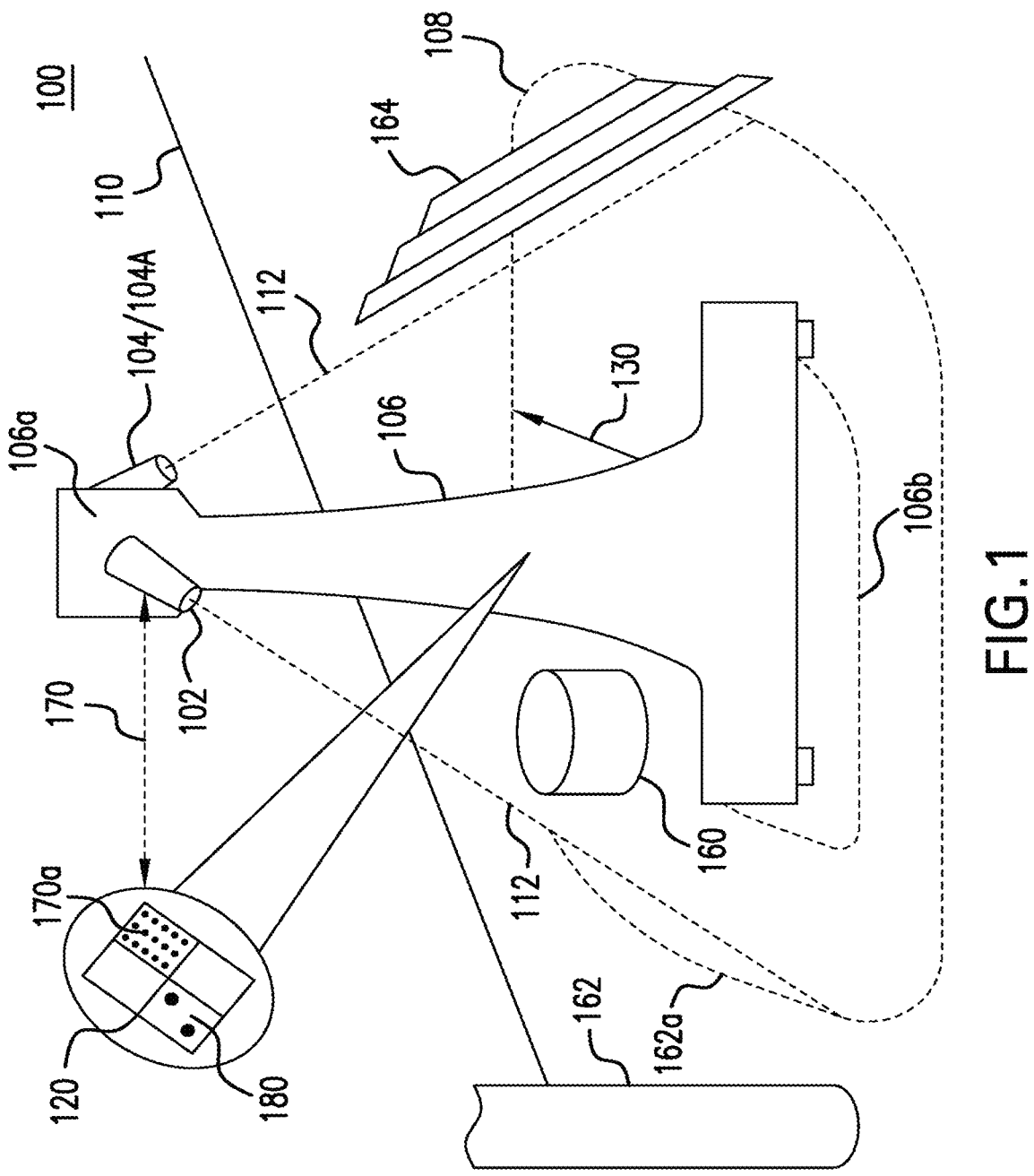
FIG. 1 illustrates an exemplary robot in an operating environment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the terms "engine", "application", or "module", as used herein, do not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

The disclosure provides a highly accurate apparatus, system and method for docking with a charging and/or information transfer station by an autonomous robot. This may be achieved by the use of advantageous sensors and sensor arrangements as compared to the known art, and by the use of improved processing methodologies for the data provided by those sensors and sensor arrangements.

More specifically, the embodiments may provide a mobile robot having a 360 degree field of view (FoV) for obstacle assessment. Embodiments may use as few as two depth cameras to provide this FoV, and the geometry and obstacle-assessment techniques provided enable rich amounts of information to be extracted from the depth data provided by the FoV sensors.

FIG. 1 illustrates a system 100 according to embodiments. As shown, two or more sensors 102, 104, such as cameras, such as 3D depth cameras, may be mounted substantially proximate to the top 106a of a mobile robot 106. Of course, in some embodiments, the requisite three-dimensional field of view (FoV) 108 from atop the robot 106 may be provided by multiple other camera types or like-sensors at particular heights or angles other than those specifically detailed herein, rather than by the use of 3D depth cameras at the height and angles discussed with respect to FIG. 1, as will be understood to one of ordinary skill in the art in light of the discussion herein.

The sensors 102, 104 may be aimed, such as prior to active use, substantially vertically, such as in a range of 10 degrees to 45 degrees from vertical, toward the floor 110 upon which the mobile robot 106 will operate. This aiming 112 may be at a particular angle known to the software, firmware, and/or hardware that is executed by the computer processing system 120 discussed herein, such as may be based upon execution of code stored in the non-transitory computing memory as discussed herein.

In an embodiment, two 3D cameras 102, 104 may be employed as shown, such as one on the front side of the mobile robot 106, and one on the rear side of the mobile robot 106. Of course, other configurations for the affixation points for cameras 102, 104 may be used in accordance with the disclosure. In accordance with the configuration illustratively provided in FIG. 1, and due to the height of the cameras in the illustration, the combined FoV 108 of cameras 102, 104 may include an area extending in all directions from the robot 106 to a distance of up to several meters, such as in a range of 1-3 meters, and more particularly approximately 2 meters, based on the use of two depth sensors/cameras and the height of the top 106a of the robot 106.

Although not specifically shown in FIG. 1, it will be appreciated, in light of the discussion herein, that some embodiments may similarly employ a number of cameras greater than two, such as in instances wherein the length or breadth of the mobile robot 106 is such that more than two cameras are required to see the floor 110 in all directions around the robot 106 to a desired lateral distance 130 from the robot 106. Of course, this desired lateral distance 130 may be correspondent, such as in the algorithms of the software or firmware executed by processing system 120 as discussed herein, not only to the height or breadth of the robot, but also or rather to the capabilities of the robot 106, such as the maximum speed or turning radius of which the robot's driving hardware is capable, or such as the safety equipment or collision avoidance algorithms forming part of the robot provide for.

By way of non-limiting example, current commodity 3D cameras are suitable to distinguish obstacles 160, 162, 164 that have a height of at least 2-4 cm above the floor 110, even from a camera height of 3-8 feet. Further, such cameras can distinguish slopes, holes, stairs or cliffs 164 that are as shallow as 2-4 cm, even from a camera height of 3-8 feet.

In the typical known art, the aforementioned exemplary 3D depth cameras may have a minimum lateral range 130 starting point of between 20 cm and 60 cm outward from the robot 106, and the lateral FoV would then extend outwardly about the robot from that starting point. However, because the disclosed cameras 102, 104 may look downward from a significant height on the robot, such as from 3-8 feet above the plane of the floor 110 as referenced above, obstacles 160, 162, 164 at or near ground level can be detected very close, laterally, to the robot. Indeed, in embodiments, the lateral outward reach of the FoV may have a starting point on the robot body 106 itself.

In one embodiment, the aforementioned exemplary 3D cameras 102, 104 may typically have a frame rate of between 15 and 90 fps. This frame rate may provide for near-instantaneous response times to the data 170 produced from the cameras 102, 104. As such, response time for the appearance of a static or a dynamic obstacle 160, 162, 164 is limited only by the frame rate of the camera, which is minimal for the aforementioned exemplary camera, plus a very small amount of processing overhead time consumed by the processing system 120 discussed herein.

Accordingly, the mobile robot 106 may include one or more processing systems 120 onboard the robot 106, and these processing systems 120 may have associated therewith one or more computing memories having associated therewith non-transitory computing code which, when executed by the one or more processing systems, causes to be provided the algorithms, calculations, comparisons and relations discussed throughout. The processing system 120 onboard the robot may additionally include communication capabilities for the transceiving of communications to and from offboard the robot. By way of example, such communication capabilities may include near field communications (NFC), Bluetooth, local area network (such as WiFi), wide area network, cellular network, infrared, or other communication methodologies, as discussed further herein below with respect to FIG. 4. It will be appreciated that the onboard processing system 120 of the robot 106, to the extent the aforementioned communication capabilities are provided, may handle all principal processing, such as application of the algorithms, calculations, comparisons and relations discussed throughout, or may share principal processing at least partially or fully off board the robot 106, without departing from the disclosure.

The 106 robot aligns to a docking station (500, shown in FIGS. 2A and 2B) for charging by AR tags 502 with the use of the cameras discussed above. There are three AR tags (502a, 502b, 502c) located on the docking station 500 and two AR tags 506a, 506b located on the back of the robot 106. The three AR tags (502a-502c) on the docking station 500 are placed in predetermined locations in reference to the docking connector 510 on the dock. The two AR tags (506a, 506b) on the autonomous robot are located in predetermined locations in reference to the charging connector 510 on the robot 106. The three AR tags 502 on the docking station are visualized by a depth camera (e.g. 104) or a depth camera having RGB IR capabilities (104a) and mounted on the same side of robot 106 as docking connector 512 on robot 106. AR tags 502 are identified by processing systems 120 onboard the robot 106 and a virtual alignment point 520 is calculated. This virtual point alignment point is the center of the charging connector 510. The two AR tags (506a. 506b) on the robot 106 serve the same purpose. A virtual alignment point 522 is also calculated to the center of robot charging connector. The docking method consists of connecting these two virtual mounting points (520, 522). In the case of failed dock (no connection), the robot 106 will pull away from the dock and make another attempt.

Figure 2A:
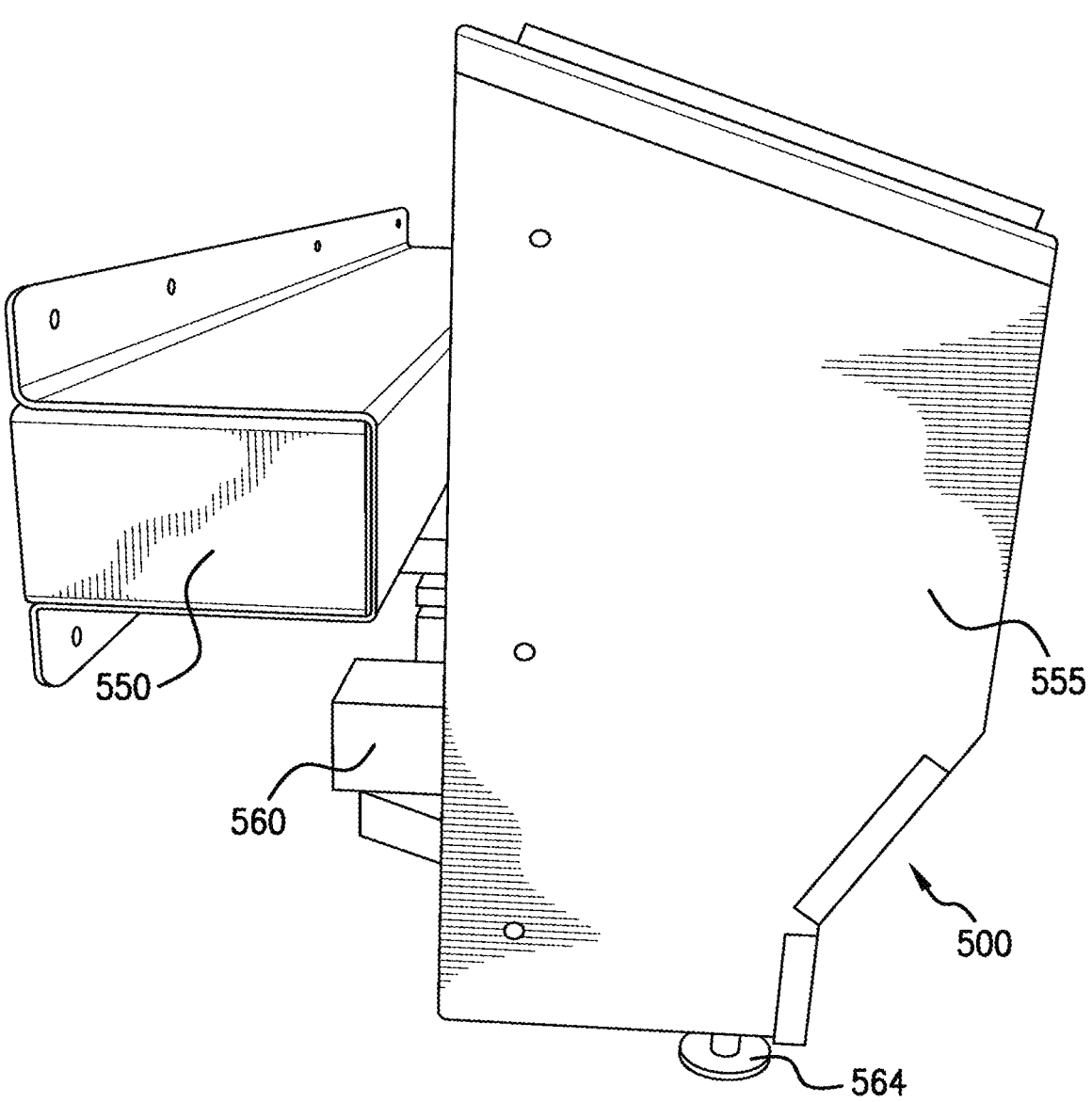
FIG. 2A illustrates an exemplary charging station in an operating environment.

Referring to FIG. 2A, docking station 500 includes separate wall mount 550 and charging base 555. Charging base 555 contains a Delta charger 560. No additional electronics needed. In one embodiment the Delta charging fins are exposed to allow for adequate ventilation. Support feet 564 elevate charging base 555 from the floor.

Figure 2B:
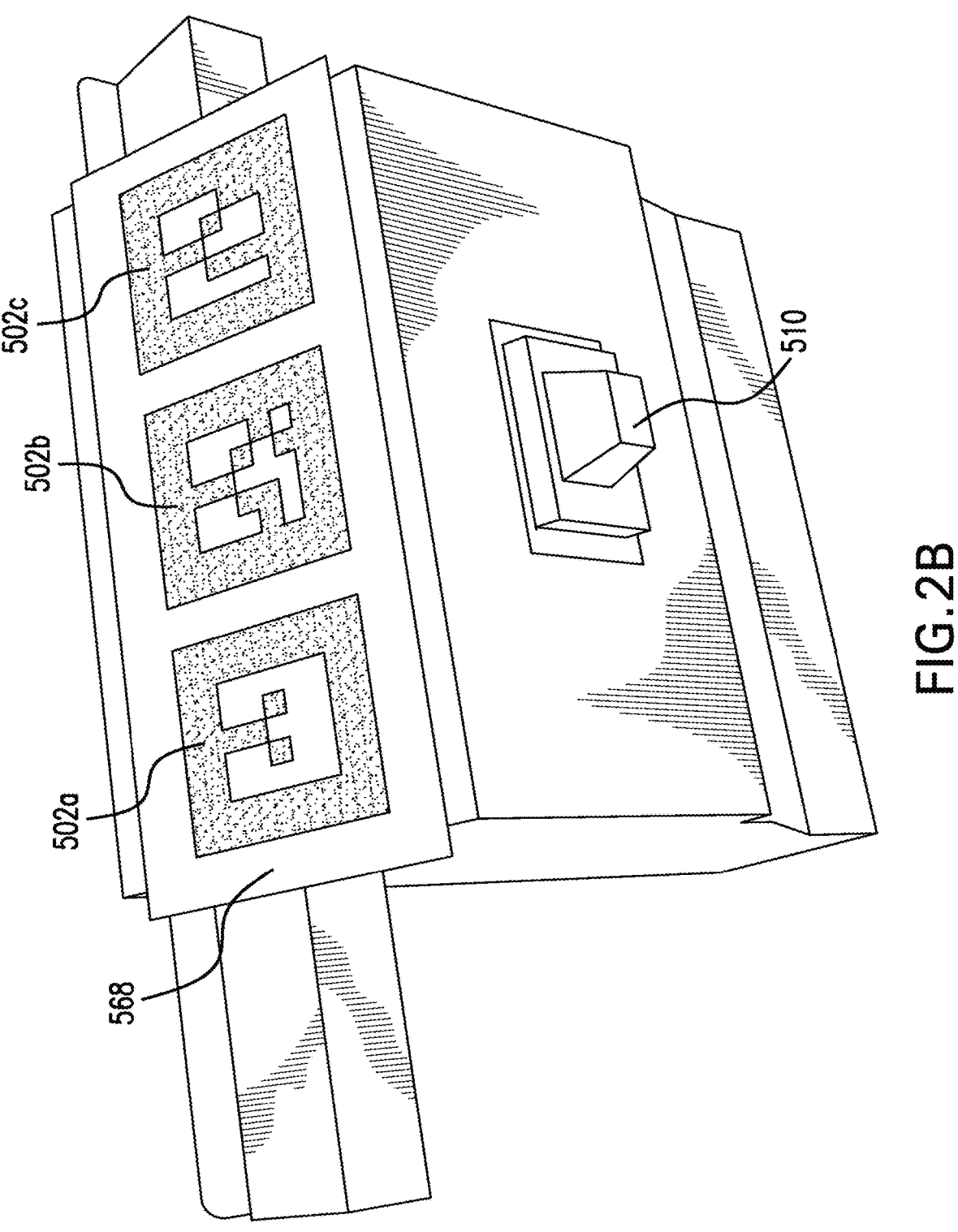
FIG. 2B illustrates an exemplary charging station in an operating environment.

As shown in FIG. 2B, floating charging connector 510 allows for 3-axis movement for adjustable and reliable docking connection. AR tags 502a, 502b, 502c are placed on upper surface 568 and used for docking alignment as describe above. In this embodiment, upper surface 568 is set at a predetermined angle so the surface thereof is perpendicular to the field of view of depth camera having RGB IR capabilities (104a).

Figure 3:
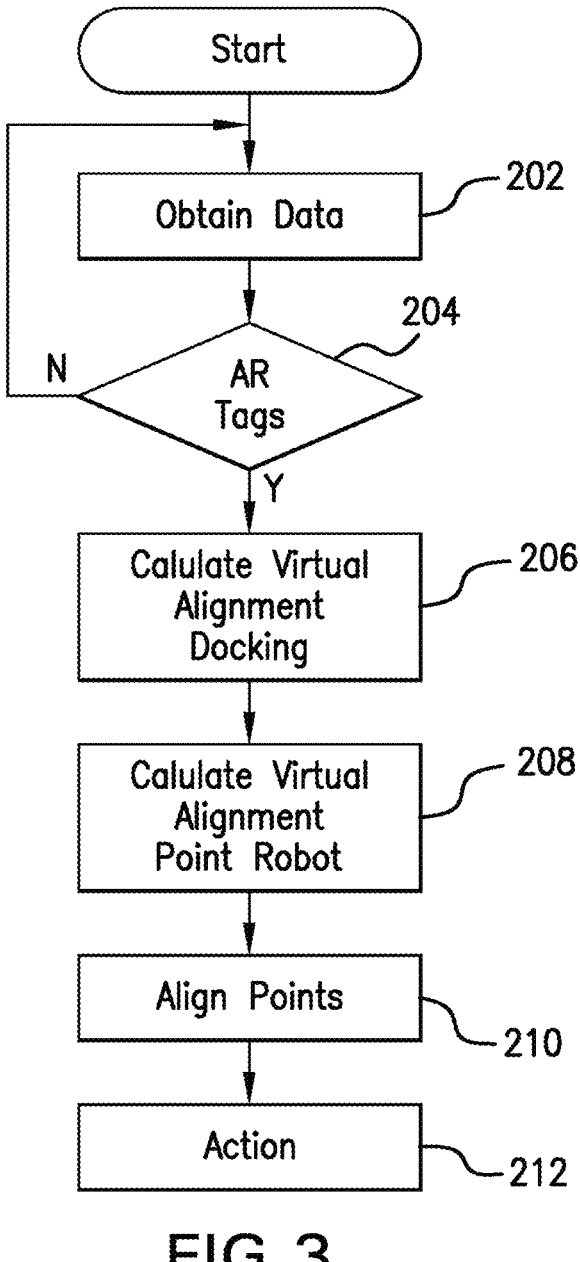
FIG. 3 illustrates an exemplary method of operating an autonomous robot.

FIG. 3 is a flow diagram illustrating a method 200 in accordance with the embodiments. In the method 200 shown, sensor data is obtained from a multi-3D depth camera system at step 202. This data is assessed for the presence of AR tags 502a, 502b, 502c on docking station 500 at step 204. At step 206, a virtual alignment point, associated with the center of the docking connector 510, is calculated by the processing system. In step 208, AR tags

506a and 506b on robot 106 are used to calculate a virtual alignment point associated with the center of the robot docking connector 512.

Alignment between the virtual alignment point associated with the center of the robot docking connector 512 virtual alignment point, associated with the center of the docking connector 510 is assessed at step 210. At step 212, an action for the robot is indicated based on the output of step 210.

Figure 4:
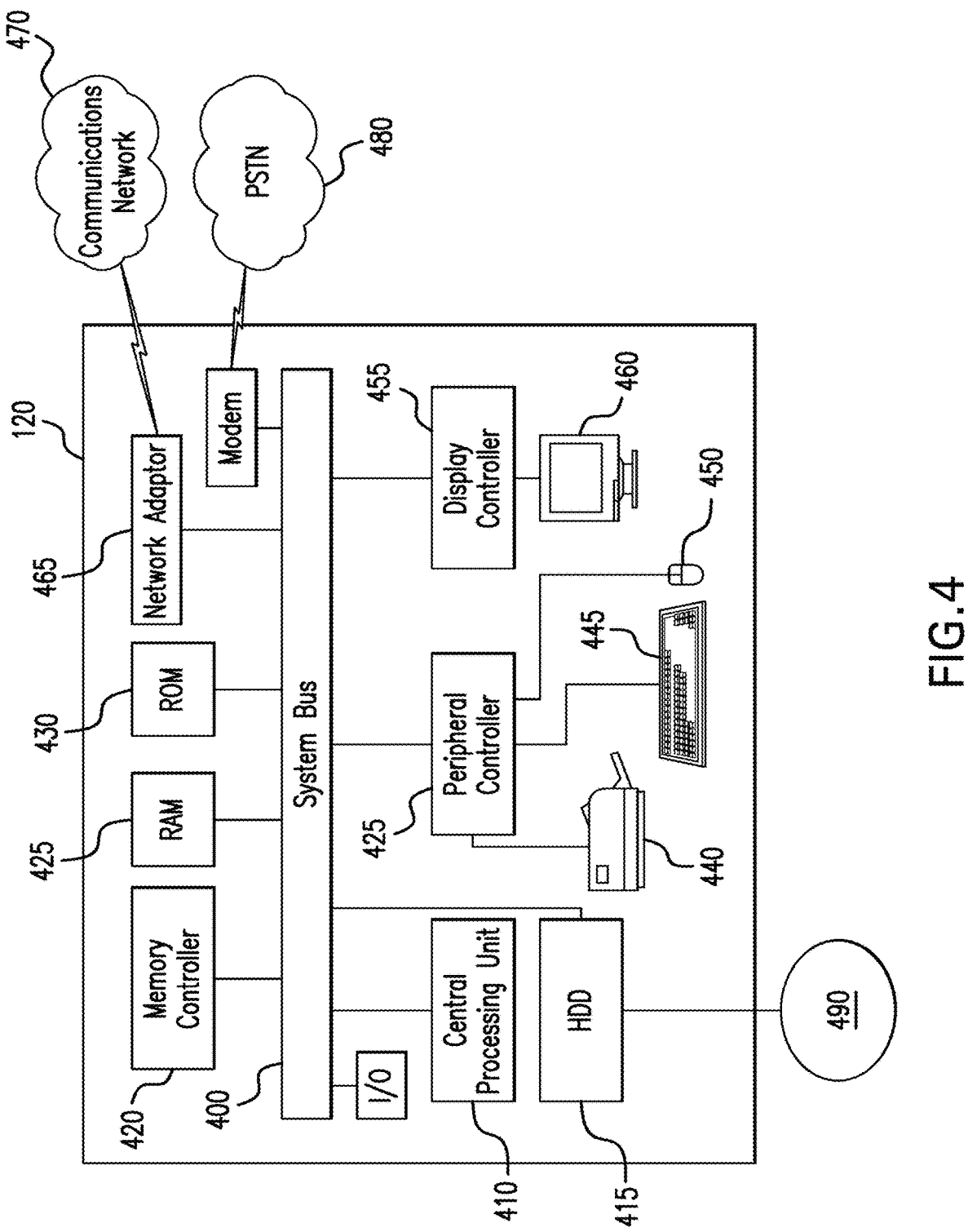
FIG. 4 is a schematic diagram illustrating an exemplary processing system.

FIG. 4 depicts an exemplary computer processing system 120 for use in association with the embodiments, by way of non-limiting example. Processing system 120 is capable of executing software, such as an operating system (OS) and one or more computing algorithms/applications 490 such as those discussed throughout. The operation of exemplary processing system 120 is controlled primarily by the computer readable instructions/code discussed throughout, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 120 to perform the disclosed operations, comparisons and calculations. In many known computer servers, workstations, personal computers, and the like, CPU 410 is implemented in an integrated circuit called a processor.

It is appreciated that, although exemplary processing system 120 is shown to comprise a single CPU 410, such description is merely illustrative, as processing system 120 may comprise a plurality of CPUs 410. Additionally, system 120 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 120 via the system's main data-transfer path. The main data-transfer path may use a system bus architecture 405, although other computer architectures (not shown) can be used, such as architectures using serializers and deserializers and crossbar switches to communicate data between devices over serial communication paths. System bus 405 may include data lines for sending data, address lines for sending addresses, and control lines for sending interrupts and for operating the system bus. Some busses provide bus arbitration that regulates access to the bus by extension cards, controllers, and CPU 410.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420. Memory controller 420 may provide an address translation function that translates virtual addresses into physical addresses as instructions are executed.

In addition, processing system 120 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 120, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 120 may contain network adapter 465 which may be used to couple system 120 to external communication network 470, which may include or provide access to the Internet, an intranet, an extranet, or the like. Communications network 470 may provide access for processing system 120 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. An autonomous mobile robot having a height of at least one meter and having a docking station, the robot and the docking station system comprising:

a charging station resident at the docking station, comprising:

a charging base wherein the charging base is elevated from a major floor surface;

a base docking connector, wherein the base docking connector comprises a floating connector extending from a side of the charging base;

an upper surface having at least one AR tag disposed on the upper surface; and the robot comprising:

a robot body;

at least one three-dimensional depth camera sensor affixed to the robot body proximate to a full extent of the height, wherein the at least one three-dimensional depth camera sensor is directed toward the major floor surface from where it is affixed;

a docking connector configured to make a physical and electrical connection to the base docking connector, whereby the autonomous mobile robot is charged;

at least two AR tags, the at least one three-dimensional depth camera, the docking connector, and the at least two AR tags being disposed on one side of the robot; and a processing system communicative with the at least one three-dimensional depth camera sensor and comprising non-transitory computing code which, when executed by at least one processor associated with the processing system, causes to be executed the steps of:

receiving data for a field of view from the at least one three-dimensional depth camera sensor;

detecting a presence of the at least one AR tag on the upper surface of the charging base;

calculating a virtual alignment point associated with a center point of the robot's docking connector, wherein the center point of the robot's docking connector is calculated based on the at least two AR tags on the robot;

calculating a virtual alignment point associated with the center of the base docking connector; and outputting a path of travel between the center of the base docking connector and the center of the robot's docking connector, whereby a physical and electrical connection is made between the base docking connector and the robot's docking connector.

2. The robot and docking system of claim 1, wherein the at least one three-dimensional depth camera sensor is a three-dimensional depth camera with RGB IR capabilities.

3. The robot and docking system of claim 1, wherein the upper surface of the charging station is substantially parallel to the field of view of the at least one three-dimensional depth camera sensor on the robot.

4. The robot and docking system of claim 1, wherein the at least one three-dimensional depth camera sensor comprises two three-dimensional depth camera sensors.

5. The robot and docking system of claim 4, wherein the two three-dimensional depth camera sensors provide the field of view comprised of 360 degrees.

6. The robot and docking system of claim 4, wherein a first of the two three-dimensional depth camera sensors is on a front side of the robot body, and wherein a second of the two three-dimensional depth camera sensors is on a rear side of the robot body, in relation to forward motion of the robot body.

7. The robot and docking system of claim 6, wherein the processing system further executes the step of avoidance of detected obstacles.

8. The robot and docking system of claim 7, wherein the detected obstacles are dynamic.

9. The robot and docking system of claim 7, wherein the detected obstacles are static.

10. The robot and docking system of claim 1, wherein the processing system further executes the step of obstacle detection within the field of view.

11. The robot and docking system of claim 1, wherein the field of view from the at least one three-dimensional depth camera sensor comprises a directed range of the sensor of between 10 degrees and 45 degrees from vertical.

12. The robot and docking system of claim 1, wherein the at least one three-dimensional depth camera sensor has a frame rate of between 15 and 90 fps.

13. The robot and docking system of claim 1, wherein the upper surface of the charging station comprises at least three AR tags.

14. The robot and docking system of claim 1, wherein the at least one three-dimensional depth camera sensor comprises at least two three-dimensional depth camera sensors.

15. The robot and docketing system of claim 14, wherein the at least two three-dimensional depth camera sensors are positioned 3-8 feet above the major floor surface.

16. The robot and docketing system of claim 15, wherein the at least two three-dimensional depth camera sensors are arranged and capable of distinguishing shallow bodies on the major floor surface that are at least 2-4 cm.

17. The robot and docketing system of claim 15, wherein the at least two three-dimensional depth camera sensors are arranged and capable of:

providing a minimum lateral range of the field of view from about a starting point of the robot body to less than 20 cm.

18. The robot and docketing system of claim 1, wherein the charging base comprises a delta charger.

19. The robot and docketing system of claim 1, wherein the charging base is wall mounted.

\*     \*     \*     \*     \*